(12) United States Patent
Hedman et al.

(10) Patent No.: US 9,885,269 B2
(45) Date of Patent: Feb. 6, 2018

(54) GAS FLOW REGULATING FOR CLEANING A PARTICULAR FILTER

(71) Applicants: Volvo Truck Corporation, Göteborg (SE); Renault Trucks, St Priest (FR)

(72) Inventors: Albin Hedman, Göteborg (SE); Gert-Ove Wahlström, Askim (SE); Tobias Stålfors, Göteborg (SE); Ervin Omerspahic, Göteborg (SE); Ladislaf Verbo, Maubec (FR)

(73) Assignees: Volvo Truck Corporation, Göteborg (SE); Renault Trucks, St. Priest (FR)

( * ) Notice: Subject to any disclaimer, the term of this patent is extended or adjusted under 35 U.S.C. 154(b) by 673 days.

(21) Appl. No.: 14/385,261

(22) PCT Filed: Jun. 20, 2013

(86) PCT No.: PCT/EP2013/001820
§ 371 (c)(1),
(2) Date: Sep. 15, 2014

(87) PCT Pub. No.: WO2014/015928
PCT Pub. Date: Jan. 30, 2014

(65) Prior Publication Data
US 2015/0034126 A1   Feb. 5, 2015

Related U.S. Application Data

(63) Continuation of application No. PCT/IB2012/001809, filed on Jul. 26, 2012.

(51) Int. Cl.
*F01N 3/023* (2006.01)
*B08B 5/02* (2006.01)
(Continued)

(52) U.S. Cl.
CPC ....... *F01N 3/0237* (2013.01); *B01D 46/0068* (2013.01); *B01D 46/04* (2013.01);
(Continued)

(58) Field of Classification Search
CPC .... F01N 3/0237; F01N 3/0214; F01N 3/0232; F01N 3/0233; F01N 3/0222;
(Continued)

(56) References Cited

U.S. PATENT DOCUMENTS

2004/0226290 A1   11/2004   Bailey

FOREIGN PATENT DOCUMENTS

| CN | 101932800 A | 12/2010 |
|---|---|---|
| JP | S57171015 A | 10/1982 |

(Continued)

OTHER PUBLICATIONS

Japanese Official Action (Mar. 9, 2017) from corresponding Japanese App. 2015-523431.
(Continued)

*Primary Examiner* — Mikhail Kornakov
*Assistant Examiner* — Natasha N Campbell
(74) *Attorney, Agent, or Firm* — WRB-IP LLP

(57) ABSTRACT

A gas flow regulating device for cleaning a particulate filter is configured to be arranged in connection to the filter at a side thereof in a through-flow of a gas to be used for cleaning the filter. The device is a standalone unit configured to be removably installed in connection with a cleaning process, wherein the device includes a frame defining a gas flow passage and a gas flow regulating element arranged inside the frame, wherein the gas flow regulating element is provided with at least one opening for gas through-flow and a blocking part capable of blocking a portion of a gas through-flow area of the filter such as to force the gas to flow through the at least one opening, wherein the gas flow
(Continued)

regulating element is movably arranged between at least two different positions, and wherein the at least one opening covers different portions of the gas through-flow area in the different positions. An arrangement for cleaning a particulate filter including such a device, and a method for cleaning a particulate filter using such a device are also provided.

25 Claims, 7 Drawing Sheets

(51) Int. Cl.
B01D 46/00 (2006.01)
B01D 46/04 (2006.01)
F01N 3/021 (2006.01)
F01N 3/022 (2006.01)

(52) U.S. Cl.
CPC .............. *B08B 5/02* (2013.01); *F01N 3/0214* (2013.01); *F01N 3/0232* (2013.01); *F01N 3/0233* (2013.01); *F01N 3/0222* (2013.01); *F01N 2290/04* (2013.01); *F01N 2290/06* (2013.01)

(58) Field of Classification Search
CPC . F01N 2290/04; F01N 2290/06; B01D 46/04; B01D 46/48; B01D 46/0067; B01D 46/0068; B01D 46/0079; B08B 5/02
See application file for complete search history.

(56) References Cited

FOREIGN PATENT DOCUMENTS

| JP | S63259115 | 10/1988 |
| JP | H05098936 | 10/1991 |
| JP | 2004270690 | 9/2004 |
| JP | 2005256795 | 9/2005 |
| JP | 2006242185 | 9/2006 |
| JP | 2010144640 A | 7/2010 |
| WO | 2012041455 A1 | 4/2012 |

OTHER PUBLICATIONS

Internatonal Search Report (dated Apr. 24, 2013) for corresponding International Application PCT/IB2012/001809.
JP57171015 Patent Abstracts of Japan (Oct. 21, 1982) Nippon Denso Co. Ltd.
JP63259115 Patent Abstracts of Japan (Oct. 26, 1988) Hino Motors Ltd.
JP03253712 Patent Abstracts of Japan (Nov. 12, 1991) Hino Motors Ltd.
Chinese Official Action (dated Aug. 2, 2015) for corresponding Chinese App. 201380004110.9.

GAS FLOW REGULATING FOR CLEANING A PARTICULAR FILTER

BACKGROUND AND SUMMARY

The invention relates to a gas flow regulating device for cleaning a particulate filter. The invention also relates to an arrangement for cleaning a particulate filter comprising such a device, and to a method for cleaning a particulate filter using such a device.

A diesel particulate filter (DPF) removes organic and inorganic particulate matter (PM) from the exhaust gas stream of an engine. The organic particulate is a complex blend of carbon, hydrogen and oxygen, and is a result of incomplete combustion of the diesel fuel in the cylinder. The inorganic portion of the PM has its source in the additives in the lubrication oil or fuel, and material eroded from the engine surfaces. A large part of these inorganic substances consist of metal sulphur oxides, for example calcium sulphate. This means they will permanently clog the particulate filters in the long run. Under optimal circumstances, the organic PM will fully combust during filter regeneration and thus leave the filter as gaseous $CO_2$ and $H_2O$. The inorganic component, on the other hand, can not be oxidized inside the filter and converted to gaseous components. Instead it is trapped in the filter as various oxides, commonly termed "ash". To maintain acceptable performance, the ash must be periodically removed from the filter to prevent it from clogging.

Some installations of diesel particulate filters (DPF) are made on engines which have operating temperatures too low to properly regenerate the filter, for instance, by oxidizing the organic PM. In these cases, the filter can become clogged with PM and potentially reduces the performance of the engine. In addition, a filter with a high soot load has a higher chance of permanent damage through uncontrolled regeneration than one with low soot load. In these cases of insufficiently high operating temperature, regular removal of the soot may be required.

Prior art approaches to filter cleaning, as discussed below, are often complex or comprise moving parts, while others are ineffective at removing tightly bound particulate matter. Other processes can lead to high PM emissions during the cleaning process.

The following examples illustrate a number of prior approaches (e.g., devices and methods) and their disadvantages.

I. Cleaning the DPF when Removed from the Engine

A simple way to clean a filter is with a compressed air hose. The hose is directed into the exit face of the filter, thus blowing the soot out of the wall in the reverse direction to which it was initially deposited (i.e., backwashing or back flushing). This method is imprecise, potentially dangerous (compressed air hazards), requires the full attention of an operator, and if improperly performed can lead to emission of PM from the filter end as well as a poorly cleaned filter.

The dirty filter can be heated in an oven to a high temperature in order to effectively remove the carbon-based particles. This requires a significant energy input and does not remove the inorganic ash. After a heating cycle, the cool down period is significant, and the ash must be removed through vacuuming or washing the filter.

Many systems for cleaning industrial devices utilize a combination of liquid flow and ultrasound, which may be effective, but can be comparatively expensive. In addition, the cleaning liquid can damage the catalytic coating or the matting material which secures the catalyst within its metal housing.

Other methods have described cleaning systems which involve backwashing with a suitable "cleaning fluid" until the filter is clean. However, many catalysts and their matting material are sensitive to large amounts of water or solvents. Solvents have the additional disadvantage of requiring disposal. In addition, the flow of cleaning fluid might not be controlled locally (i.e., a single fluid stream flows over the unit), so that some sections of the filter might not be cleaned as well as others.

A problem with such solution is that all garages or service facilities may not have suitable equipment for filter cleaning. In this case the vehicle may need to be fitted with a replacement filter to remain in operation while the filter is being cleaned. This requires a store of relatively expensive filters to be maintained by the garage or haulage company, in order to have access to replacement filters at all times.

II. Cleaning the DPF while Mounted on the Engine

Methods for collecting particulate using several particulate filters with valves to control the flow path are described in a number of patent documents.

For instance, U.S. Pat. No. 5,930,994 shows a combination of valve settings can start the back-flush of one of the filters i.e., the direction of gas flow is reversed and flows to push the soot out of the filter. The reversed gas flow can be heated to allow soot to be burned off as the air passes the DPF.

U.S. Pat. No. 5,725,618 discloses a method which 'backwashes' a DPF to remove the particulate and ash collected in the filter. The backwashing occurs while the device is on the vehicle, and an impact air valve is used to provide a pressure wave to dislodge the particulate matter. In order to allow the entire DPF to be cleaned, the filter unit is rotated in order to expose a predetermined sector of the filter unit to the air stream supplied by the impact air valve.

The above "back-flush" methods have the disadvantage that the ash from the lubricating oil never leaves the filter system, as back-flushed ash from one element flows into another element, and manual cleaning will still be required. Also, the dislodged material must somehow be removed from the exhaust conduit receiving said material.

JP3253712 and WO2012/041455 disclose valve and gas channel arrangements for reversing the exhaust gas flow through the filter and propose the use of this flow for cleaning. These arrangements are, however, rather difficult to apply in practice because the additional gas channels require additional space and reduce the gas flow velocity which may become too low for efficient cleaning.

III. Rotating Arms

A further method of cleaning a DPF involves a device using a rotating electrical heating element. A portion of the exhaust gas bleeds through a rotating arm and flows over the heating element. The combination of low flow rate and high temperature improves the chance of regeneration.

U.S. Pat. No. 5,116,395 discloses a dust collector with on-board programmable cleaning control. A rotating arm with a plurality of nozzles mounted upon it provides the back-flushing flow, thus causing the particulate to be removed from the bag surface and settle into a collection chamber. The control system operates the arm and nozzles to produce jets of cleaning fluid above the various bag units. The arm also contains a sensor for determining the dirtiness of each filter element (a pitot tube is suggested). The system described in the patent has several design elements which make it unsuitable for use in diesel particulate filter applications. First, DPFs are much smaller than dust collectors, and the nozzle designs in the above dust collector are specialized for large filters. A typical DPF is between 15 cm and 32 cm in diameter. The dust collector shown in the patent appears have a relatively large diameter. Second, DPFs can have many thousand cells, and thus focusing air on each individual cell is impractical. Other similar designs for dust collectors have the same shortcomings.

It is desirable to provide solutions for achieving an sufficient cleaning of a vehicle particle filter in a cost-efficient way.

According to a first aspect, a gas flow regulating device for cleaning a particulate filter is provided, said device being configured to be arranged in connection to the filter at a side thereof in a through-flow of a gas to be used for cleaning the filter. The inventive device is characterized in that it is a standalone unit configured to be removably installed in connection with a cleaning process. The device comprises a frame defining a gas flow passage and a gas flow regulating element arranged inside the frame, wherein the gas flow regulating element is provided with an opening structure comprising at least one opening for gas through-flow and a blocking part capable of blocking a portion of a gas through-flow area of the filter such as to force the gas to flow through the at least one opening, wherein the gas flow regulating element is movably arranged between at least two different positions, and wherein the opening structure covers different portions of the gas through-flow area in said different positions.

The inventive device is thus a form of adapter intended to be connected to the filter during cleaning and disconnected when the cleaning is completed. Typically, the device is kept at a service facility where the cleaning process is to be performed. When the device is connected to the filter it forces the gas flow to pass through a smaller area, i.e. through the at least one opening, which increases the velocity of the gas flow. This accelerated gas flow will pass through only a portion of the parallel gas channels normally arranged in a particulate filter. Due to the increased speed of the cleaning gas flow, the cleaning process will be more efficient. By moving the gas flow regulating element between the at least two positions, either stepwise or continuously, and thus block some cleaned gas channels and expose some other non-cleaned channels from/to the cleaning gas flow, the entire filter can be cleaned portion by portion in an efficient manner.

Such an adapter may be used by an operator/owner of the vehicle and/or a service station for the cleaning. The adapter is cost-efficient in production and requires no specific design solutions on the particulate filter or the exhaust system, which creates conditions for a cost efficient solution.

The side of the filter intended to form an inlet side for the gas flow to be used for cleaning preferably forms the outlet side of the filter during its normal operation. This way a "back-flush" effect is achieved during cleaning. The gas flow regulating device is preferably arranged on the side of the filter forming the inlet side during cleaning.

The inventive device is primarily intended for applications where an exhaust gas flow is used for cleaning but can be used also for other cleaning gas flows, such as an air flow.

Typically, the inventive device is intended for applications where the device is connected to a particulate filter that has been removed from its normal operational position prior to cleaning. However, the inventive device can be connected to a filter that is to be cleaned while remaining in its normal operational position.

In an embodiment of the invention the gas flow regulating element is arranged in a turnable manner around an axis that is substantially parallel with an intended gas flow direction in the gas flow passage defined by the outer frame. Thus, the gas flow regulating element can form a plate extending in a plane perpendicular to the direction of the gas flow. Preferably, the gas flow regulating element is configured for a stepwise or continuous turning such that, when the gas flow regulating element has been turned 360 degrees, the at least one opening has covered the entire gas through flow area of the filter.

According to a further embodiment, the frame comprises a first flange for connection to the particulate filter during the cleaning process. A flange is cost efficient to achieve on the frame, for example in the case the frame is formed by a tubular sheet, the flange may be achieved by bending a free end of the sheet radially outwards. Alternatively, the flange may be achieved by rigidly attaching a separate element to the outer surface of the frame, for example by welding or soldering. Preferably, the first flange has the shape of a radially projecting portion from the frame, especially of a relatively thin design, such as a single sheet. Further, preferably, the first flange is preferably inclined in a manner commensurate with the shape of the contacting surface of the particulate filter flange so that it may be firmly connected to the particulate filter flange, such as via clamping.

According to a further embodiment, the first flange has a shape configured for attachment to a flange of the particulate filter, which is configured for attachment of the particulate filter to a gas supplying unit in an operative position of the filter, for attachment of the gas flow regulating device to the particulate filter flange via said first flange. Preferably, the first flange has the shape of a radially projecting portion from the frame, especially of a relatively thin design, such as a single sheet. Further, preferably, the first flange is preferably inclined in a manner commensurate with the shape of the contacting surface of the particulate filter flange so that it may be firmly connected to the particulate filter flange, such as via clamping via a V-shaped clamping band/ring or similar.

Preferably, the first flange is positioned in the vicinity of a first end surface of the gas flow regulating device in an intended gas flow direction.

According to a further embodiment, the frame comprises a second flange for connection to a gas supplying unit capable of providing said through-flow of gas. Thus, the gas flow regulating device may be firmly connected to the gas supplying unit, which may be a component of an exhaust system of the internal combustion engine, via said second flange.

According to a further embodiment, the second flange has an at least substantially similar shape as a flange of the particulate filter, which is configured for an attachment of the particulate filter to the gas supplying unit in an operative position of the filter, for attaching the flow regulating device to the gas supplying unit flange via the second flange. This embodiment creates conditions for using the same connection means of the gas supplying unit for the filter attachment during ordinary operation as for connection of the gas flow regulating device during cleaning. Thus, no specific design of the gas supplying unit is required.

Further, the second flange may be formed by a bent sheet, which is rigidly attached to the frame via welding or soldering. The bent sheet may comprise two cylindrical contact surfaces at an axial distance from each other and an intermediate portion forming a loop in the form of a U-shape or V-shape or similar in cross section.

Preferably, the second flange is positioned in the vicinity of a second end surface of the gas flow regulating device in an intended gas flow direction. Preferably, the second flange is positioned at a sufficient distance from the closest end surface of the gas flow regulating device for achieving a support of an axially projecting portion of the frame past the second flange to an interior surface of the gas supplying unit. Especially, the first flange is positioned at an axial distance from the second flange.

The design of the gas flow regulating device with the first and second flange creates conditions for arranging the gas flow regulating device in a position between the gas supplying unit and the particulate filter for the cleaning operation. More specifically, the particulate filter would first be removed from the gas supplying unit, the gas flow regulating device attached to the flange of the gas supplying unit via the second flange and to the particulate filter via the first flange, wherein the gas flow regulating device would form an intermediate member creating a distance between the gas supplying unit and the particulate filter during the cleaning operation.

Preferably, the first and/or second flange extends in a continuous manner around the entire frame. Alternatively, the first and/or second flange extends in a discontinuous manner around the frame.

According to a second aspect, an arrangement is provided for cleaning a particulate filter comprising a device of the above type, a particulate filter, wherein the gas flow regulating device is connectable to the filter at a side thereof intended to form an inlet side for a gas flow to be used for cleaning the filter.

According to a third aspect, a method is provided for cleaning a particulate filter, comprising the steps of: connecting a gas flow regulating device of the above type to a particulate filter at a side thereof for through-flow of a gas to be used for cleaning the filter; and supplying a flow of cleaning gas to the gas flow regulating device and the particulate filter.

According to one embodiment, the particulate filter is mounted in an operative position attached to a gas supplying unit under normal operation of said engine, the method further comprising the steps of:

disassembling and removing the particulate filter from the gas supplying unit;
attaching the gas flow regulating device to the gas supplying unit,
reassembling the particulate filter in a reversed position to the gas flow regulating device before supplying the flow of cleaning gas.

BRIEF DESCRIPTION OF DRAWINGS

The invention will be described in detail with reference to the attached figures. It is to be understood that the drawings are designed solely for the purpose of illustration and are not intended as a definition of the limits of the invention, for which reference should be made to the appended claims. It should be further understood that the drawings are not necessarily drawn to scale and that, unless otherwise indicated, they are merely intended to schematically illustrate the structures and procedures described herein.

FIG. 9 shows an axial cross section of the device of FIG. 8a.

DETAILED DESCRIPTION

Figure 1:
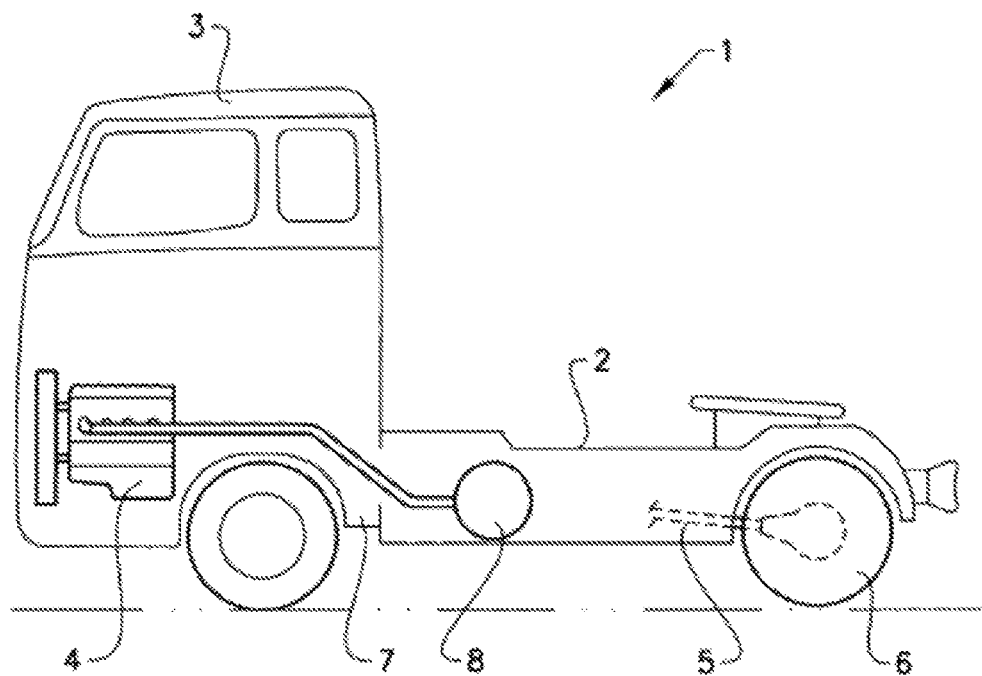
FIG. 1 shows a vehicle provided with a cleaning muffler with a particulate filter.

FIG. 1 shows a commercial vehicle 1 in the form of a tractor unit. The commercial vehicle 1 comprises a chassis 2 and a driver's cab 3 mounted on the chassis. Underneath the driver's cab 3 is an internal combustion engine 4, in the form of a diesel engine, which acts on the drive wheels 6 of the commercial vehicle 1 by way of a drive train 5 comprising a clutch and a manual transmission or an automatic transmission. The internal combustion engine 4 comprises an exhaust gas system 7 with a muffler 8 provided with an exhaust after-treatment system (EATS) including a particulate filter 18 connected to a tailpipe (not shown) which expels the exhaust gases to the atmosphere.

Figure 2:
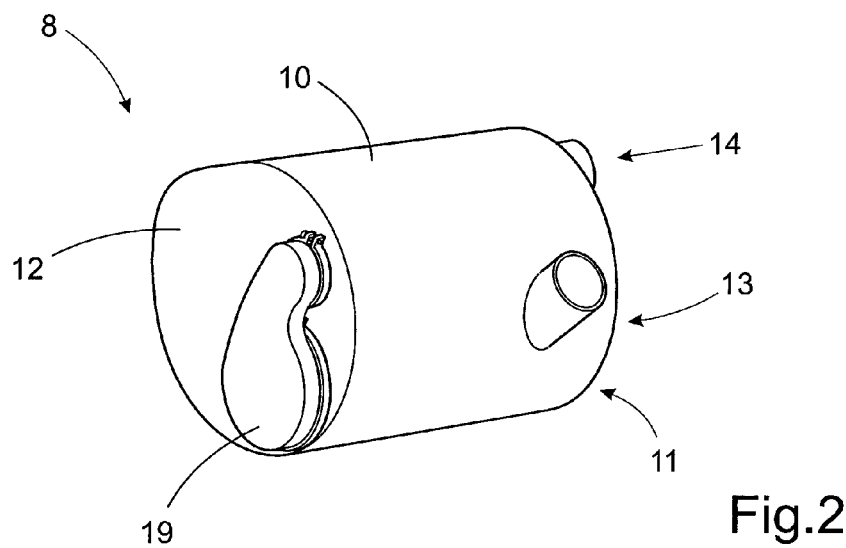
FIG. 2 shows a muffler with a particulate filter in its operative position.
Figure 3:
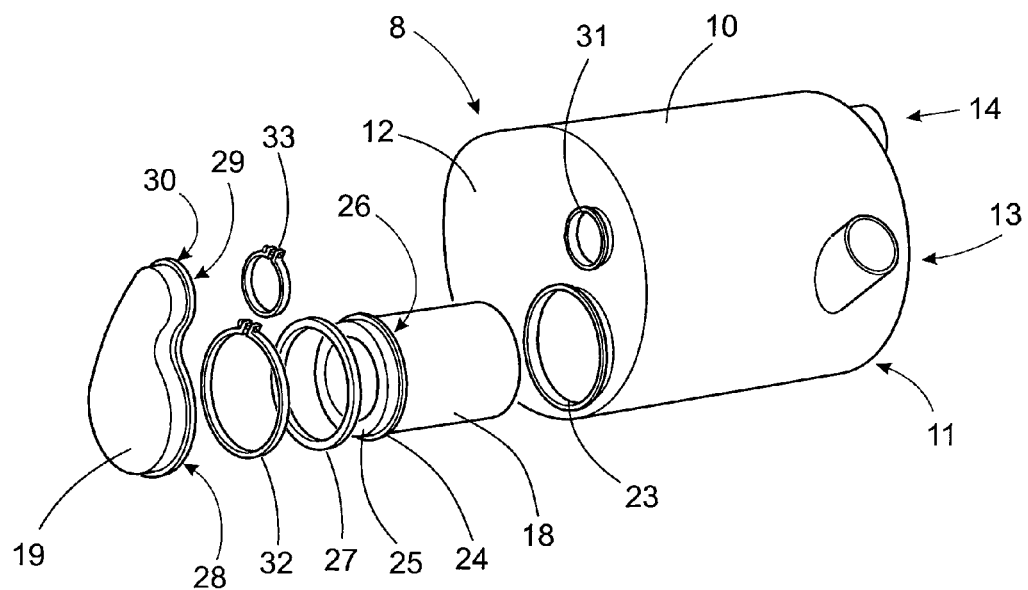
FIG. 3 shows an exploded view of a muffler with a particulate filter.
Figure 4:
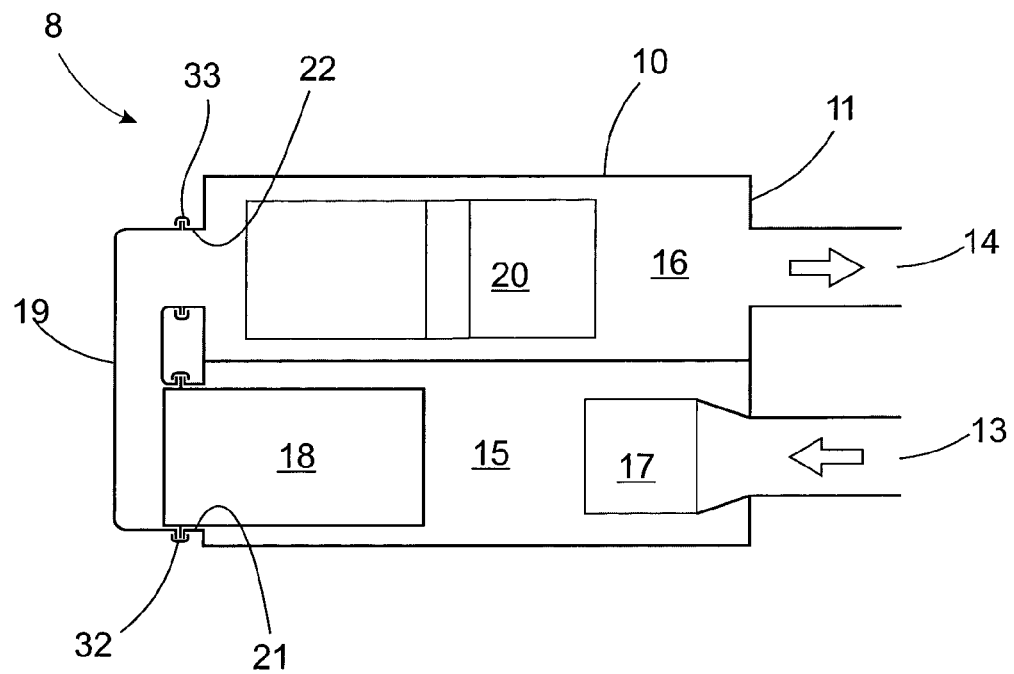
FIG. 4 shows a schematic cross-section through the muffler in FIG. 2.

The muffler 8, which is installed in the commercial vehicle 1 according to FIG. 1 adjacent to the internal combustion engine 4 and which is attached to the frame of the chassis 2, can be constructed as shown in FIGS. 2 to 4. This muffler 8 is designed in the form of a drum and comprises a front-end wall 11 and a rear-end wall 12; and a hollow at least partially cylindrical circumferential outside wall 10, which connects both end walls 11, 12. An intake conduit 13 and an exhaust conduit 14, for normal operation, are provided in the front end wall 11. The muffler 8 also comprises an internal separating wall extending throughout the inner space of the muffler, dividing the muffler 8 into two separate internal volumes 15, 16. This can be seen in FIG. 4, which shows a cross-section through the muffler 8 with the particulate filter 18 in its operational position. With reference to FIG. 4, a first volume 15 contains a first exhaust purifying means in the form of an oxidizing catalyst 17 located downstream of the intake conduit 13 and upstream of the particulate filter 18, in this case a substantially cylindrical diesel particulate filter (DPF). A second volume 16 contains an exhaust purifying means in the form of a selective catalytic reactor 20, or SCR catalyst, located upstream of the exhaust conduit 14. The first and second volumes 15, 16 are connected by a substantially U-shaped conduit 19, which extends from a first opening 21 to a second opening 22 in the rear end wall 12. The U-shaped conduit 19 is configured to deflect an incoming gas flow from a first gas flow direction to a second gas flow direction, which is substantially opposite the first gas flow direction.

FIG. 3 shows an exploded view of a portion of the muffler 8 with the particulate filter 18 and the U-shaped conduit 19 removed. As indicated in FIG. 3, the first opening in the rear end wall 12 comprises a tubular outlet with a first flange 23. The first flange 23 is arranged to cooperate with and seal against a circumferential flange 24 located adjacent the rear, first end 25 of the particulate filter 18. A first ring shaped seal or O-ring 26 is, placed between the flanges 23, 24 to ensure that the connection is gas tight during normal operation. A second ring shaped seal or O-ring 27 is placed between the circumferential flange 24 and a first flange 28 at the inlet end of the U-shaped conduit 19 for the same purpose. Similarly, a third ring shaped seal or O-ring 29 is placed between a second flange 30 at the outlet end of the U-shaped conduit 19 and a second flange 31 at the second opening in the rear end wall 12. First and second circular clamps 32, 33 are arranged to hold the particular filter 18 in place, while clamping the first and second flanges 28, 30 on the U-shaped conduit 19 onto the first and second flanges 23, 31, respectively, on the rear end wall 12. The first and second circular clamps 32, 33 have a substantially U-shaped cross-section, allowing them to be placed over the respective flanges and tightened to seal the connection between the first and second volumes inside the muffler 8. The first clamp 32 is also used for clamping the particulate filter 18 via the gas flow regulating device 50 to the first flange 23 of the rear end wall 12 when the filter is in its reversed position. This type of clamp is known in the art and will not be described in further detail. The above-mentioned seals can form integral parts of the sealing surfaces and/or comprise separate, removable seals such as O-rings.

The circumferential flange 24 is shaped so that its outer contact surface will seal against both the first flange 28 of the U-shaped conduit 19 and against a first flange 53 of the gas flow regulating device 50. This allows the particular filter 18 to be removed from its operative position in the muffler 8, as indicated in FIG. 3, to be reversed and then mounted onto the gas flow regulating device 50 which in turn is allowed to be mounted to the first flange 23 on the rear end wall 12 in a filter cleaning position, as indicated in FIGS. 5-7.

Figure 5:
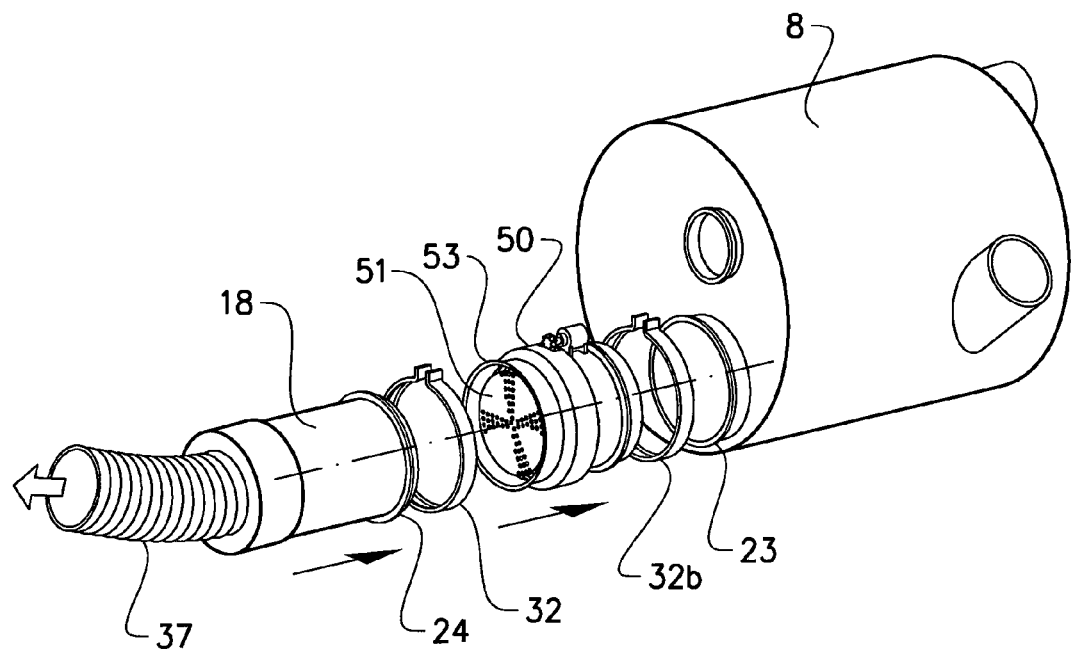
FIG. 5 shows the assembling of a muffler with a gas flow regulating device and a particulate filter connected to a suction means for extracting ash.
Figure 6:
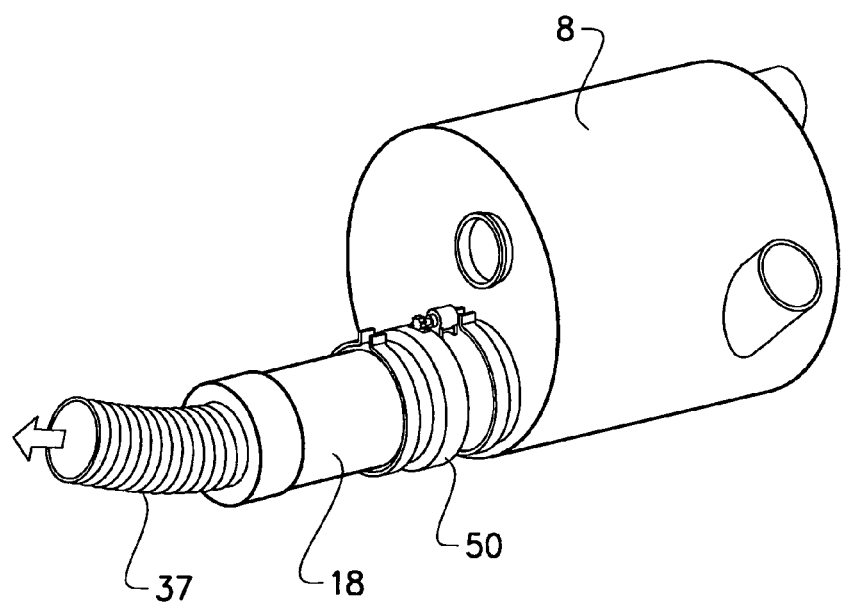
FIG. 6 shows the parts of FIG. 5 when assembled.
Figure 7:
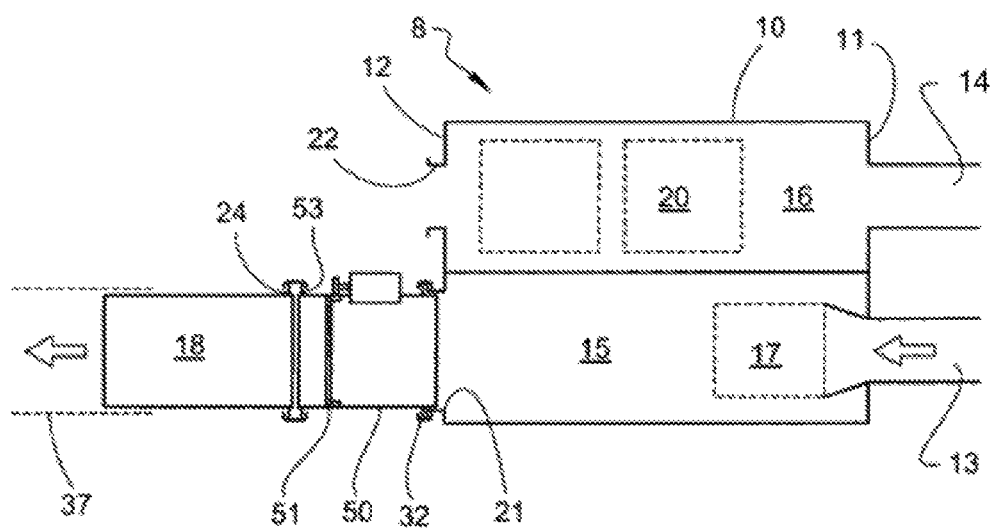
FIG. 7 shows a schematic cross-section through the arrangement in FIG. 6.

FIGS. 5-6 show the muffler 8, the gas flow regulating device 50 and the particulate filter 18 in position (about to be in position in FIG. 5) for performing a cleaning operation for the filter 18, wherein an end side of the particular filter 18 normally facing the intake conduit 13 on the front end wall 11 is open to the atmosphere. With the U-shaped conduit 19 removed and the particulate filter 18 mounted onto the rear end wall 12 via the gas flow regulating device 50, all exhaust gas will pass through the first volume 15 as the second volume 16 is bypassed. This can be seen in FIG. 7, which shows a cross-section through the muffler 8 with the particulate filter 18 in its cleaning position connected to the gas flow regulating device 50. With reference to FIG. 7, it can be seen how the exhaust gas is supplied from the intake conduit 13, flows through the first volume 15, the gas flow regulating device 50 (including the gas flow regulating element 51) and the particulate filter 18, and passed out through a collecting hose 37.

Figure 8A:
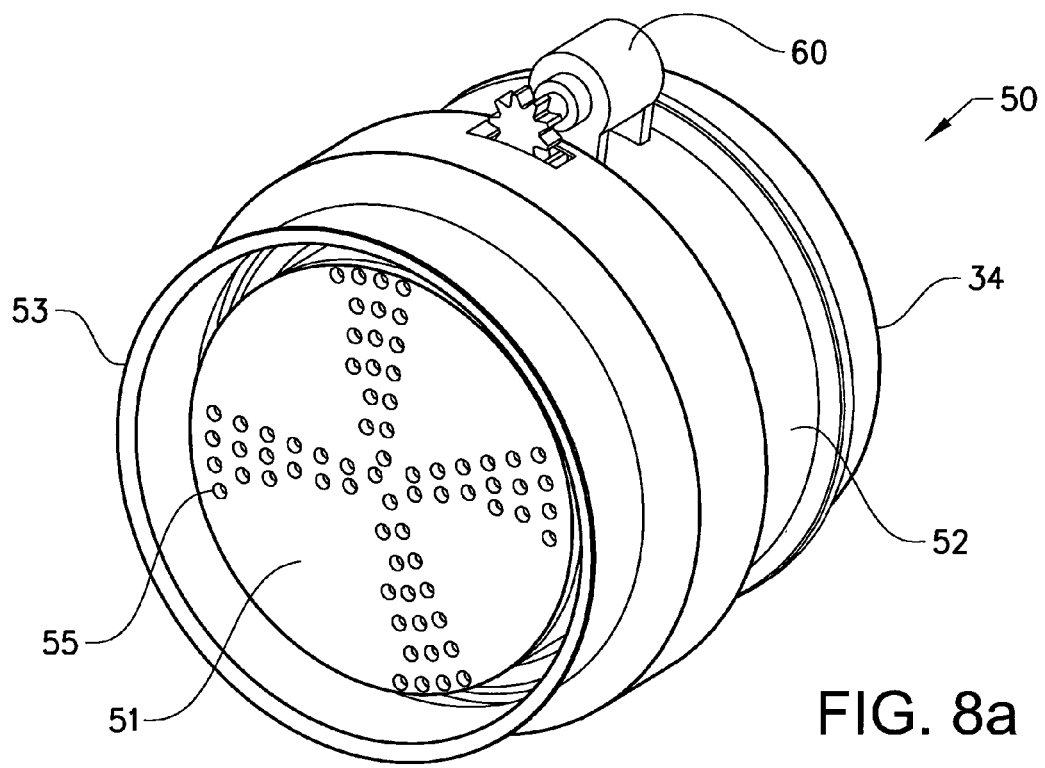
FIG. 8a shows a gas flow regulating device according to one embodiment.
Figure 8B:
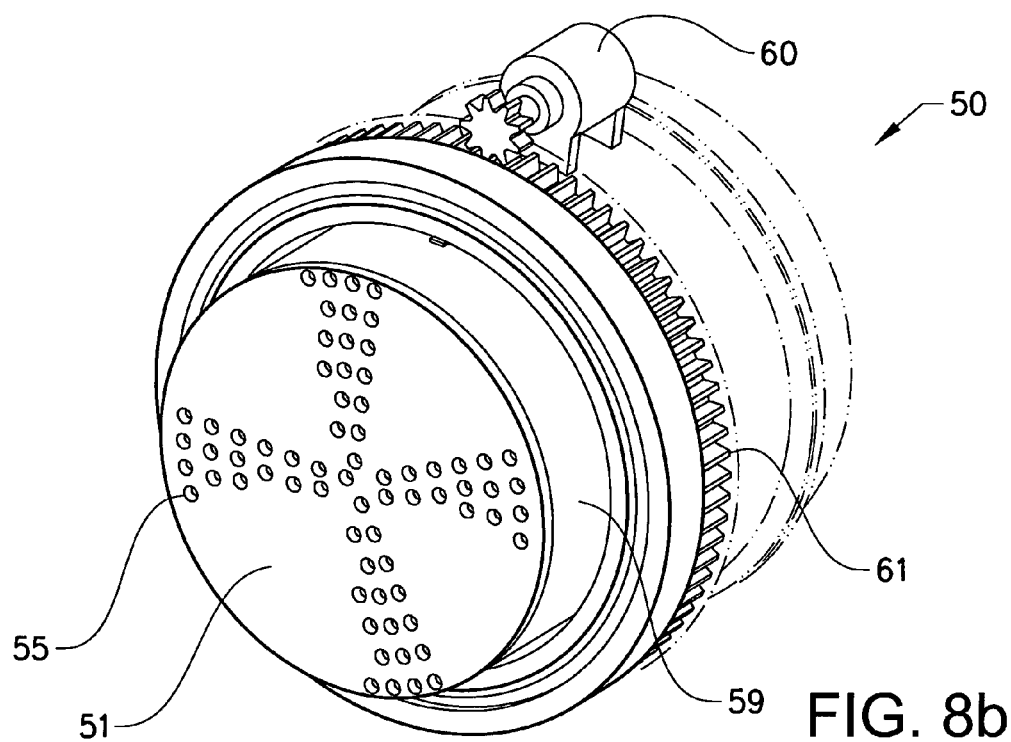
FIG. 8b shows the device of FIG. 8a with a part of the frame removed.
Figure 9:
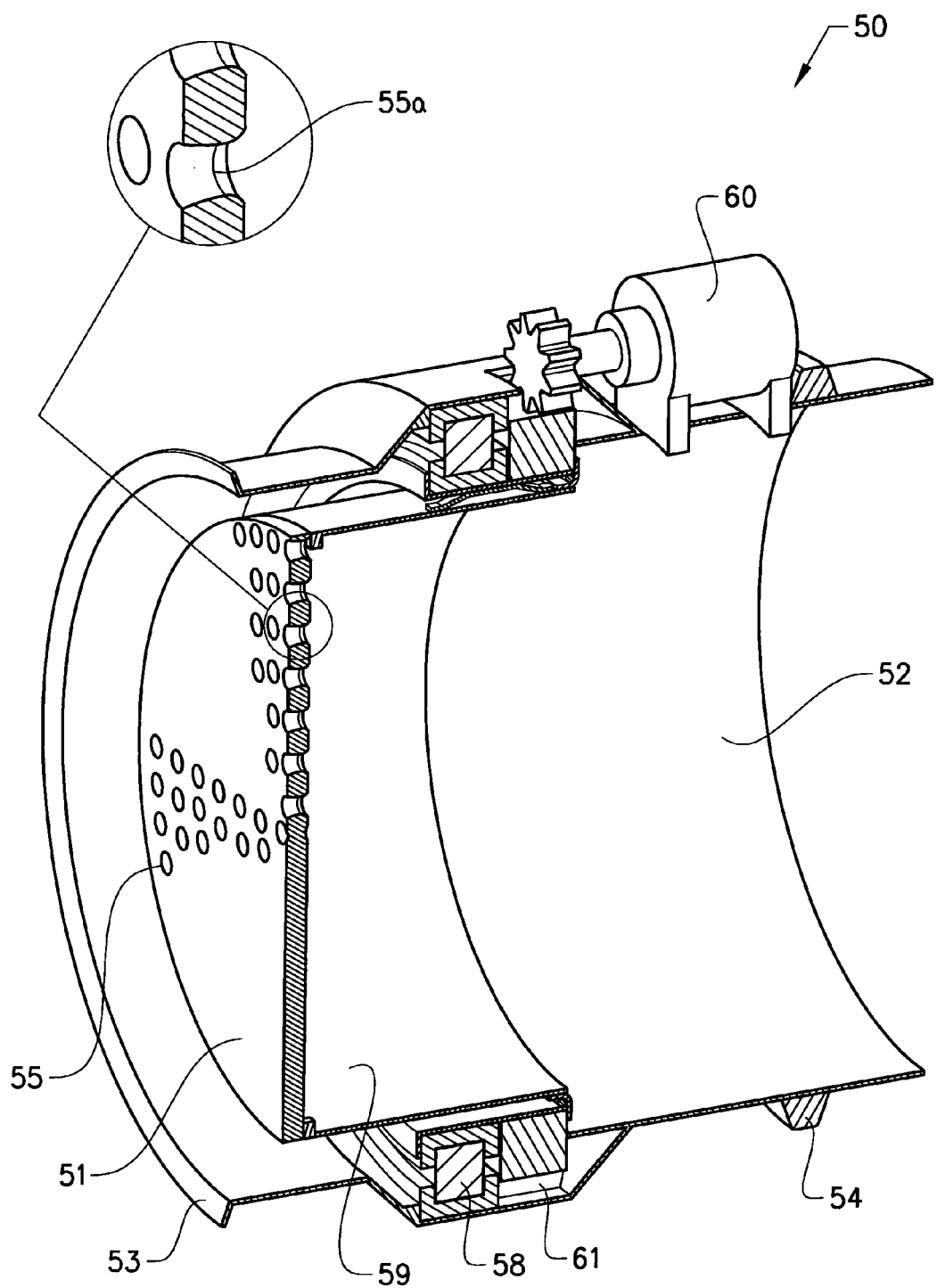

FIGS. 8a, 8b and 9 show the gas flow regulating device 50. As described above the device 50 is configured to be arranged in connection to the filter 18 at a side thereof in a through-flow of a gas to be used for cleaning the filter, and forms a standalone unit configured to be removably connected to the filter 18, and optionally to a muffler, in connection with a cleaning process. The gas flow regulating device 50 comprises a substantially cylindrical frame 52 defining a gas flow passage and a gas flow regulating element 51 arranged inside the frame 52. More specifically, the frame 52 forms a tubular member with substantially the same cross sectional shape and size as the particulate filter. In the shown embodiment, the frame has a circular cross section shape. The gas flow regulating element 51 is provided with an opening structure comprising at least one opening 55, in this example a plurality of smaller through-holes 55a distributed over a radius of the gas flow regulating element 51, for gas through-flow and a blocking part capable of blocking a portion of a gas through-flow area of the frame 52 and the filter 18 such as to force the gas to flow through the at least one opening 55. The blocking part is thus the part of the gas flow regulating element 51 that is not provided with any openings/through-holes that allow through flow of gas.

The gas flow regulating element 51 has the shape of a disc and is arranged across the gas passage defined by the frame 52, i.e. perpendicular to the direction of the gas flow. The gas flow regulating element 51 is movably arranged between different angular positions in that it is turnable/rotatable around an axis that is substantially parallel with an intended gas flow direction in the gas flow passage defined by the frame 52. The at least one opening 55 covers different portions of the gas through-flow area in the different positions and the smaller openings 55a are distributed over the radius of the element 51 so that when the element 51 has been turned 360 degrees (in the present case 90 degrees, see below), the at least one opening 55 has covered substantially the entire gas through flow area of the filter 18 (and of the gas passage defined by the frame 52).

In this example the smaller openings 55a are distributed in a pattern forming four circular sectors, which each extends from a center point of the element 51 to a periphery thereof. The circular sectors are angularly distanced from each other by a portion of the gas flow regulating element, which portion is free of any openings. Thus, said portions are formed by a continuous wall of the gas flow regulating element. This means that the element 51 needs only to be turned 90 degrees to allow the openings 55 to cover the entire gas through flow area.

The at least one opening 55 can have various shapes and can include anything from one to many openings. When a plurality of smaller openings together make up the at least one opening 55 they can be arranged in several ways. Besides being arranged in one or several circular sectors, the openings can be distributed over the radius of the element 51 in e.g. a helical pattern.

Each individual opening 55a is in this case small in relation to the total area of the at least one opening 55. The element 51 may be provided with a mix of smaller, intermediate and larger openings. The purpose of the gas flow regulating element 51 is to force the gas flow through a smaller area, i.e. the at least one opening 55, such as to increase its speed and thereby improve the cleaning of the filter 18. The total area of the at least one opening 55 should in most cases be smaller than 50% of the area of the element 51. In principle the gas velocity increases with decreasing area of the at least one opening 55. At some point, however, the total area of the opening 55 might be too small for effective cleaning (pressure drop etc.).

An advantage of using small openings, instead of one or a few large openings, for forming the at least one opening 55 is that the shape of the through-hole can be used to significantly affect the gas flow. As shown in the magnified view in FIG. 9 a cross section of the smaller openings 55a is larger at an intended gas flow entrance end of the smaller openings 55a than at a distance downstream of the entrance end. This way the gas flow can be accelerated, or at least less retarded, while passing through the opening in the 55a in the element 51. A rounded venturi-shape is suitable but a similar shape but without rounded edges also has an advantageous effect and is much easier to produce. The length of the through-hole, and thus the thickness of the element 51, has an influence in this regard. In order for the shape of the through-hole to have a significant effect on the gas flow velocity the thickness of the element 51 should be at least 5 mm, preferably around 10 mm. A very thick element 51 would be heavy and expensive.

The frame 52 comprises a first flange 53 for connection to the particulate filter 18 during the cleaning process and a second flange 54 for connecting the device 50 to a gas supplying unit, such as the muffler 8, capable of providing said through-flow of gas.

The second flange 54 has an at least substantially similar shape as a flange 24 of the particulate filter 18, which is configured for a removable attachment of the particulate filter 18 to a gas supplying unit 8, for attaching the flow regulating device 50 to the gas supplying unit 8 via the second flange 54. The second flange 54 is positioned in the vicinity of a second, gas inlet, end surface of the gas flow regulating device 50 in an intended gas flow direction. The first flange 53 has a shape configured for attachment to a flange 24 of the particulate filter 18, which is configured for a removable attachment of the particulate filter 18 to a gas supplying unit 8, for attachment of the gas flow regulating device 50 to the particulate filter via said first flange 53. The first flange 53 is positioned in the vicinity of a first, gas outlet, end surface of the gas flow regulating device 50 in an intended gas flow direction. Flanges and connections are also described above in relation FIGS. 1-4.

A bearing member 58 is configured to support the gas flow regulating element 51 is arranged in the frame 52, which bearing member extends circumferentially around the gas flow regulating element 51 and allows the gas flow regulating element 51 to move in a rotational manner. It also seals the element 52.

The gas flow regulating element 51 is axially displaced towards an intended gas flow exit end of the frame 52 in relation to the bearing member 58 accomplished by a pipe shaped extension 59 that connects the gas flow regulating element 51 and the bearing member 58 (see FIG. 9). This way the bearing member 58 can be arranged at a distance from the end part of the element 51 so as to avoid interfering with the connection to the filter 18 while the element 51 at the same time can be arranged close to the end of the device 50 so as to be placed close to the filter 18 when connected for guiding the gas flow in a better way into the channels of the filter 18.

The device 50 comprises an actuator capable of rotating the gas flow regulating element. In this example the actuator comprises an electric motor 60 arranged to act on a gear wheel 61 connected to the gas flow regulating element 51.

An arrangement for cleaning a particulate filter comprises a gas flow regulating device 50 according to above and a particulate filter 18, wherein the gas flow regulating device 50 is connected to the filter 18 at a side thereof intended to form an inlet side for a gas flow to be used for cleaning the filter 18. This is shown in FIGS. 6-7. In this example the gas flow regulating device 50 is further connected to a gas supplying unit in the form of the muffler 8 capable of supplying a flow of cleaning gas to the gas flow regulating device 50. The muffler 8 forms an example of a component arranged in an exhaust system downstream of an internal combustion engine and provides for the use of a flow of exhaust gas from the internal combustion engine as cleaning gas.

The particulate filter will project a distance out from the muffler during a cleaning operation and due to the that the total weight of the gas flow regulating device and the particulate filter may be significant, preferably the cleaning arrangement may comprise a support structure for supporting the gas flow regulating device and/or the particulate filter during a cleaning operation. The support structure may be configured for supporting the gas flow regulating device and/or the particulate filter in the cleaning position above the ground. The support structure therefore may comprise a support leg with a ground contact portion at a first end and an engagement portion at a second end, opposite the first end, wherein the engagement portion is configured for engaging the particulate filter and/or the gas flow regulating device. According to one alternative, the engagement portion is configured to engage an external surface of the particulate filter and/or the gas flow regulating device. According to a further alternative, the particulate filter and/or the gas flow regulating device is provided with specific engagement means configured for engagement with the engagement portion of the support leg. Preferably, a length of the support leg is adjustable and set in different positions, for example in that the leg is in a two-part construction, wherein the parts are configured in a rail-like construction or similar and lockable in different relative positions via a pin engaging two holes, one from each of a row of hole, provided in the longitudinal direction in each part of the support leg.

A method for cleaning a particulate filter, such as the filter 18, comprises the steps of:
- connecting the gas flow regulating device 50 to the particulate filter 18 at a side thereof for through-flow of a gas to be used for cleaning the filter 18; and
- supplying a flow of cleaning gas to the gas flow regulating device 50 and the particulate filter 18.

As exemplified here, the step of supplying the flow of cleaning gas comprises the steps of connecting an exhaust gas system of an internal combustion engine to the gas flow regulating device 50 and supplying exhaust gas from said engine for cleaning the filter.

As also exemplified here the particulate filter can be of a type mounted in an operative position attached to a gas supplying unit, the muffler 8, under normal operation of said engine, wherein the method can further comprise the steps of:
- disassembling and removing the particulate filter 18 from the gas supplying unit 8;
- attaching the gas flow regulating device 50 to the gas supplying unit (see FIG. 5), and
- reversing and attaching the particulate filter 18 in a cleaning position to the gas flow regulating device (see FIG. 5).

Where the particulate filter is mounted in an operative position inside an exhaust muffler under normal operation of said engine, the method can further comprise the steps of:
- disassembling and removing the particulate filter 18 from a first end of the muffler 8;
- reversing and reassembling the particulate filter 18 in a cleaning position via at said first end of the muffler 8 with the gas flow regulating device 50 arranged between the first end of the muffler 8 and the particulate filter 18.

The method may also comprise the steps of:
- starting and operating the engine by controlling the engine speed according to a predefined cycle until a predetermined condition is fulfilled, and
- stopping the engine and returning the particulate filter 18 to its operative position inside the exhaust muffler 8.

The invention is not limited to the above examples, but may be varied freely within the scope of the appended claims.

The gas flow regulating device 50 may be used to in connection to a cleaning gas flow that is not an exhaust gas, for instance an air flow.

The gas flow regulating element 51 does not necessarily have to be rotationally movable but could be movable in a direction perpendicular to the axial direction of the gas flow regulating device 50. A rotational movement is, however, likely to provide for a more reliable function.

The gas flow regulating element 51 may have an at least partially circular outer periphery wherein the at least one opening 55 is positioned eccentrically, for instance, the at least one opening 55 could comprise only one opening extending from a center point to the periphery of the gas flow regulating element 51. Such an opening can have the shape of a circular sector, which preferably has an angle smaller than 90 degrees and preferably smaller than 45 degrees.

The invention claimed is:

1. A gas flow regulating device for cleaning a particulate filter, the device being configured to be arranged in connection to the filter at a side thereof in a through-flow of a gas to be used for cleaning the filter,
wherein the device is a standalone unit configured to be removably installed in connection with a cleaning process,
wherein the device comprises a frame defining a gas flow passage and a gas flow regulating element arranged inside the frame,
wherein the gas flow regulating element is provided with an opening structure comprising at least one opening for gas through-flow and a blocking part capable of blocking a portion of a gas through-flow area of the filter such as to force the gas to flow through the at least one opening,
wherein the gas flow regulating element is movably arranged between at least two different positions,
wherein the opening structure covers different portions of the gas through-flow area of the filter in the different positions,
wherein the frame comprises a first flange for connection to the particulate filter during the cleaning process, and
wherein the first flange has a shape configured for attachment to a flange of the particulate filter, which is configured for attachment of the particulate filter to a gas supplying unit in an operative position of the filter, for attachment of the gas flow regulating device to the particulate filter flange via the first flange.

2. A gas flow regulating device according to claim 1, wherein the gas flow regulating element is configured to cover equal portions of the gas through-flow area in the different positions.

3. A gas flow regulating device according to claim 1, wherein the gas flow regulating device is configured for turning the gas flow regulating element between at least two different angular positions.

4. A gas flow regulating device according to claim 3, wherein the gas flow regulating element has an at least partially circular outer periphery wherein the opening structure is positioned eccentrically.

5. A gas flow regulating device according to claim 4, wherein the opening structure extends from a center point to the periphery of the gas flow regulating element.

6. A gas flow regulating device according to claim 4, wherein the opening structure has the shape of a circular sector.

7. A gas flow regulating device according to claim 6, wherein the circular sector has an angle smaller than 90 degrees.

8. A gas flow regulating device according to claim 3, wherein the gas flow regulating device is configured for a stepwise or continuous turning of the gas flow regulating element such that, when the gas flow regulating element has been turned 360 degrees, the opening structure has covered the entire gas through flow area of the filter.

9. A gas flow regulating device according to claim 8, wherein the gas flow regulating device is configured for turning the gas flow regulating element around an axis that is substantially parallel with an intended gas flow direction in the gas flow passage defined by an outer frame.

10. A gas flow regulating device according to claim 1, wherein the opening structure comprises a plurality of openings distributed over a radius of the gas flow regulating element.

11. A gas flow regulating device according to claim 10, wherein a cross section of at least one of the openings is larger at an intended gas flow entrance end of the opening than at a distance downstream of the entrance end.

12. A gas flow regulating device according to claim 1, wherein the first flange is positioned in the vicinity of a first end surface of the gas flow regulating device in an intended gas flow direction.

13. A gas flow regulating device according to claim 1, wherein the frame comprises a second flange for connection to a gas supplying unit capable of providing the through-flow of gas.

14. A gas flow regulating device according to claim 1, wherein the gas flow regulating device comprises a bearing member (58) configured to support the gas flow regulating element, which bearing member (58) extends circumferentially around the gas flow regulating element and allows the gas flow regulating element to move in a rotational manner.

15. A gas flow regulating device according to claim 1, wherein the device comprises an actuator capable of rotating the gas flow regulating element.

16. A gas flow regulating device according to claim 15, wherein the actuator comprise an electric motor arranged to act on a gear wheel, which is rigidly connected to the gas flow regulating element.

17. A gas flow regulating device according to claim 1, wherein the gas flow regulating element has, the shape of a disc.

18. A gas flow regulating device for cleaning a particulate filter,
the device being configured to he arranged in connection to the filter at a side thereof in a through-flow of a gas to be used for cleaning the filter,
wherein the device is a standalone unit configured to be removably installed in connection with a cleaning process,
wherein the device comprises a frame defining a gas flow passage and a gas flow regulating element arranged inside the frame,
wherein the gas flow regulating element is provided with an opening structure comprising at least one opening for gas through-flow and a blocking part capable of blocking a portion of a gas through-flow area of the filter such as to force the gas to flow through the at least one opening,
wherein the gas flow regulating element is movably arranged between at least two different positions, wherein the opening structure covers different portions of the gas through-flow area of the filter in the different positions, wherein the frame comprises a second flange for connection to a gas supplying unit capable of providing the through-flow of gas, and wherein the second flange has, an at least substantially similar shape as a flange of the particulate filter, which is configured for attachment of the particulate filter to the gas supplying unit in an operative position of the filter, for attaching the flow regulating device to the gas supplying unit flange via the second flange.

19. A gas flow regulating device according to claim 18, wherein the second flange is positioned in the vicinity of a second end surface of the gas flow regulating device in an intended gas flow direction.

20. Arrangement for cleaning a particulate filter, comprising:

a gas flow regulating device for cleaning the particulate filter, the device being configured to be arranged in connection to the filter at a side thereof in a through-flow of a gas to be used for cleaning the filter, wherein the device is a standalone unit configured to be removably installed in connection with a cleaning process, wherein the device comprises a frame defining a gas flow passage and a gas flow regulating element arranged inside the frame, wherein the gas flow regulating element is provided with an opening structure comprising at least one opening for gas through-flow and a blocking part capable of blocking a portion of a gas through-flow area of the filter such as to force the gas to flow through the at least one opening, wherein the gas flow regulating element is movably arranged between at least two different positions, wherein the opening structure covers different portions of the gas through-flow area of the filter in the different positions, wherein the frame comprises a first flange for connection to the particulate filter during the cleaning process, and wherein the first flange has a shape configured for attachment to a flange of the particulate filter, which is configured for attachment of the particulate filter to a gas supplying unit in an operative position of the filter, for attachment of the gas flow regulating device to the, particulate filter flange via the first flange, a particulate filter, wherein the gas flow regulating device is connectable to the filter at a side thereof intended to form an inlet side for a gas flow to be used for cleaning the filter.

21. Arrangement according to claim 20, further comprising:

a gas supplying unit capable of supplying a flow of cleaning gas to the gas flow regulating device.

22. Arrangement according to claim 21, wherein the gas supplying unit is a component arranged in an exhaust system downstream of an internal combustion engine and the cleaning gas is a flow of exhaust gas from the internal combustion engine.

23. Method for cleaning a particulate filter, comprising:

connecting a gas flow regulating device to a particulate filter at a side thereof for through-flow of a gas to be used for cleaning the filter, the gas flow regulating device being configured to be arranged in connection to the filter at a side thereof in a through-flow of a gas to be used for cleaning the filter, wherein the device is a standalone unit configured to be removably installed in connection with a cleaning process, wherein the device comprises a frame defining a gas flow passage and a gas flow regulating element arranged inside the frame, wherein the gas flow regulating element is provided with an opening structure comprising at least one opening for gas through-flow and a blocking part capable of blocking a portion of a gas through-flow area of the filter such as to force the gas to flow through the at least one opening, wherein the gas flow regulating element is movably arranged between at least two different positions, wherein the opening structure covers different portions of the gas through-flow area of the filter in the different positions, supplying a flow of cleaning gas to the gas flow regulating device and the particulate filter, wherein the step of supplying a flow of cleaning gas comprises connecting an exhaust gas system of an internal combustion engine to the gas flow regulating device and supplying exhaust gas from the engine for cleaning the filter, wherein the particulate filter is mounted in an operative position attached to a gas supplying unit under normal operation of the engine, the method further comprising;

disassembling and removing the particulate filter from the gas supplying unit;

attaching the gas flow regulating device to the gas supplying unit, reassembling the particulate filter in a reversed position to the gas flow regulating device before supplying the flow of cleaning gas.

24. Method according to claim 23, wherein the particulate filter is mounted in an operative position inside an exhaust muffler under normal operation of the engine, the method further comprising:

disassembling and removing the particulate filter from a first end of the muffler;

attaching the gas flow regulating device to the gas supplying unit, reassembling the particulate filter in a reversed position to the gas flow regulating device before supplying the flow of cleaning gas.

25. Method according to claim 23, wherein the method comprises:

starting and operating the engine by controlling the engine speed according to a predefined cycle until a predetermined condition is fulfilled, and stopping the engine and returning the particulate filter to its operative position.

* * * * *